Oct. 21, 1952  H. H. LIVINGSTON  2,614,559
INTRAMEDULLARY BAR
Filed Sept. 6, 1950

INVENTOR.
Herman H. Livingston
BY
C. P. Goepel
his ATTORNEY

Patented Oct. 21, 1952

2,614,559

UNITED STATES PATENT OFFICE 2,614,559

INTRAMEDULLARY BAR

Herman H. Livingston, Bronx, N. Y.

Application September 6, 1950, Serial No. 183,340

2 Claims. (Cl. 128—92)

This invention relates to metallic structures used in the healing of fractured bones and has for its object to provide a simple and strong device which may be readily applied to a fractured bone to enable the fragments to be held in place while the bone heals.

For this purpose, the invention consists of an intramedullary bar of suitable metal, which may be placed in the medullary cavity of a bone, and held therein in spaced relationship to the bone, by means of screws passing through the bone and through any substantial fragments thereof, so that the said broken bone and/or fragments thereof, may be held in their true positions while the healing processes are proceeding to completion, for which purposes said bar is provided with a plurality of spaced holes, and companionate screws are provided for said holes, which screws have a bore diameter with an outer diameter adapted to pass through the said holes. Preferably, the cross-section of said bar may be oval in shape.

Such bars are made in several sizes as to length and width to accommodate any size of medullary cavity in any bone in humans or animals.

The screws which pass through the bone also pass through the metal bar and act to prevent rotation of the bone fragments, wandering of the bar up and down the medullary cavity, longitudinally considered, to hold the bone firmly in opposition, and to align the broken bone fragments for better healing and functioning.

The invention will be further described, an embodiment thereof shown in the accompanying drawings and the invention will be finally pointed out in the claims.

In the accompanying drawings.

Similar characters of reference indicate corresponding parts throughout the drawings.

Figure 1:
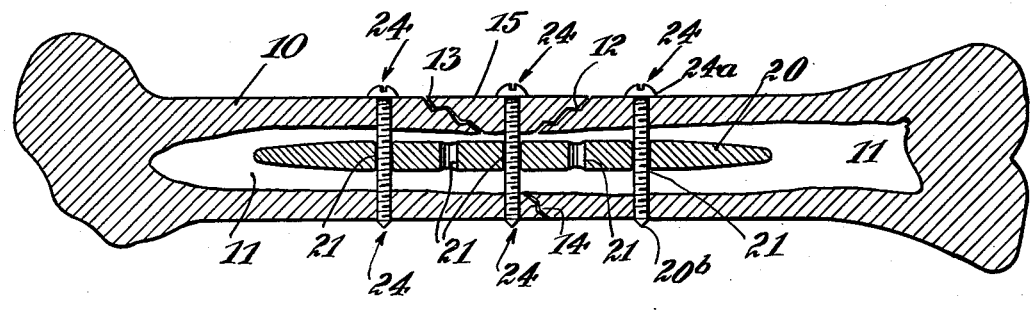
Fig. 1 is a longitudinal section of a broken bone showing its fragmentation, and having an embodiment of the improved invention applied thereto, to hold the parts in position while healing.
Figure 2:
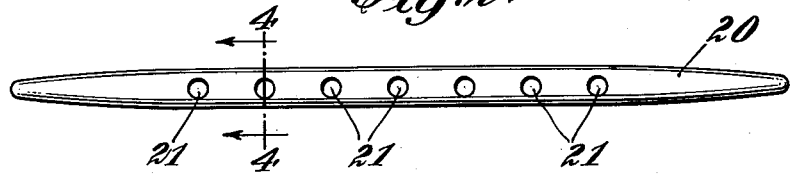
Fig. 2 is a face view of the improved intramedullary bar.
Figure 3:
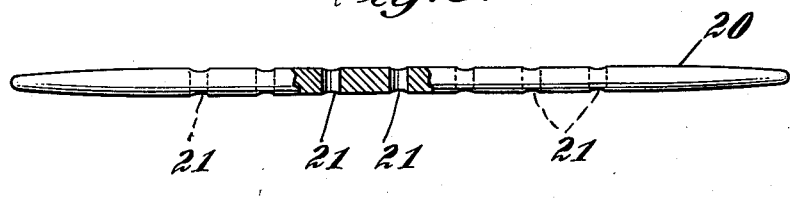
Fig. 3 is a side view thereof.

Referring to the drawings, the bone 10 has a medullary cavity 11, as known, and in Fig. 1 is shown as having been broken, as in the fragment 15 with its registering surfaces 12, 13 and 14.

Figure 4:
Fig. 4 is a vertical cross-section taken on lines 4—4 of Fig. 2.

The character of the fracture having been determined, the physician inserts into the opening made by a fracture the improved intramedullary bar 20. This bar 20 is preferably made of an oval cross-section (see Fig. 4) and has a series of spaced holes 21 through which exteriorly screwthreaded screws 24 with a slot flange 24a and point 20b pass. First, the outermost screws are put into place and so adjusted that the bar is held in position within the medullary cavity and spaced from the sides thereof so as to be free of the bone structure, such outer screws in respect to the fragment supporting screws being applied through the walls of the bone. Then the fragments are carefully placed in registration position and a screw or more applied to hold it in proper relationship so as to properly register. The adjustment of the screws to the bone structure and its fragments can be properly and conveniently and efficiently made, and when made the injured bone left to knit or heal with the parts in proper position, the bar 20 and screws 24 acting as a strengthening structure within the cavity, to hold the bone parts in their proper position.

Thus, an embodiment of the invention has a short bar transfixed by holes through which the screws may be inserted, with the bar preferably oval in cross-section to minimize rotation of fragments; a series of holes are provided for the proper relationship of the screws, the screws which pass through the bone also pass through the metal bar and act to prevent rotation of the bone fragments; the wandering of the bar up and down the medullary cavity is prevented; the bone is held firmly in opposition; and the broken bone fragments are aligned for better healing and functioning.

I wish it to be understood that I do not desire to be limited to the exact details of construction shown and described, for obvious modifications will occur to a person skilled in the art.

I claim:

1. In an intramedullary bar, the combination of a rigid metallic member having a resistance to longitudinal strains and stresses, and of a length, width and depth less than the medullary cavity of a bone, of flattened shape with its width larger than its depth, and having a plurality of spaced bores extending entirely through the depth of said member, with at least one bore at each side of and beyond a bore substantially centrally of said other bores, and spindle screws each having a pointed entrance end and a headed other end, and of a length equal to the transverse length of said bone from exterior to exterior engaging said bores and extending from each side of said member to the extent of the space between the exterior of said member and the exterior of said bone, said screws being adapted to engage the bone fragments with their pointed ends and limited in movement by their headed ends, to support said member in said cavity, in spaced position to the walls of said cavity, for healing the fractured bone.

2. An intramedullary bar of metal having a resistance to longitudinal strains and stresses, and a length, width and depth less than the medullary cavity of a bone to which said bar is to be applied, of flattened shape with its width larger than its depth, and having a plurality of spaced bores extending entirely through the depth of said member, with at least one bore at each side of and beyond a bore substantially centrally of said other bores, said bores being adapted to be engaged by screws, each having a pointed entrance end and a headed other end, and of a length equal to the transverse length of said bone from its exterior to its exterior, said screws extending from each side of said member to the extent of the space between the exteriors of said member and the exteriors of said bone, said screws being adapted to engage the bone fractures with their pointed ends and be limited in movement by said headed ends, and said member when applied to said cavity being spaced between said member and the inner walls of said cavity, whereby said screws hold the fragments together and the member prevents rotation of the parts in respect to each other.

HERMAN H. LIVINGSTON.

REFERENCES CITED

The following references are of record in the file of this patent:

UNITED STATES PATENTS

| Number | Name | Date |
|---|---|---|
| 2,518,019 | Kane | Aug. 8, 1950 |

OTHER REFERENCES

Der Chirurg for 1936, pp. 803–7. Copy in Div. 55.

The International Journal of Surgery for February 1916, pp. 33–35. Copy in Div. 55.